United States Patent
Strasser et al.

(10) Patent No.: US 12,150,230 B2
(45) Date of Patent: *Nov. 19, 2024

(54) METHODS OF PROTECTING FURNACE ELECTRODES WITH COOLING LIQUID THAT CONTAINS AN ADDITIVE

(71) Applicant: CHEMTREAT, INC., Glen Allen, VA (US)

(72) Inventors: Joseph S. Strasser, Evergreen, CO (US); Joseph M. Hamnik, Willis, TX (US); James R. Lawson, Louisville, TN (US); Alan J. Feller, Macy, IN (US)

(73) Assignee: CHEMTREAT, INC., Glen Allen, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/135,433

(22) Filed: Apr. 17, 2023

(65) Prior Publication Data

US 2023/0254953 A1 Aug. 10, 2023

Related U.S. Application Data

(63) Continuation of application No. 17/464,250, filed on Sep. 1, 2021, now Pat. No. 11,653,426, which is a
(Continued)

(51) Int. Cl.
*H05B 7/12* (2006.01)
*C09K 15/02* (2006.01)
(Continued)

(52) U.S. Cl.
CPC .............. *H05B 7/12* (2013.01); *C09K 15/02* (2013.01); *F27D 11/10* (2013.01); *H05B 7/06* (2013.01);
(Continued)

(58) Field of Classification Search
CPC .. H05B 7/12; H05B 7/06; F27D 11/10; C09K 15/02; B05D 1/02; B05D 3/002; B05D 3/0254
(Continued)

(56) References Cited

U.S. PATENT DOCUMENTS 1,000,761 A 8/1911 Snyder
3,777,040 A 12/1973 Gell et al.
(Continued)

FOREIGN PATENT DOCUMENTS

CN 107841291 A 3/2018
DE 3809361 A1 9/1989
(Continued)

OTHER PUBLICATIONS

Sep. 20, 2023 Office Action issued in U.S. Appl. No. 17/255,272.
(Continued)

*Primary Examiner* — Brian K Talbot
(74) *Attorney, Agent, or Firm* — Oliff PLC

(57) ABSTRACT

A method for forming a protective antioxidative barrier on the furnace electrodes using a chemically altered cooling liquid containing an antioxidant additive. This method can be applied to electrodes used in electric arc furnaces and ladle metallurgy furnaces. The method can involve spraying the cooling liquid onto the electrode, thereby forming the protective antioxidative barrier and reducing the oxidation of the electrode.

13 Claims, 5 Drawing Sheets

Related U.S. Application Data continuation of application No. 16/871,179, filed on May 11, 2020, now Pat. No. 11,140,755, which is a continuation of application No. 16/559,099, filed on Sep. 3, 2019, now Pat. No. 10,694,592.

(60) Provisional application No. 62/779,457, filed on Dec. 13, 2018, provisional application No. 62/745,697, filed on Oct. 15, 2018.

(51) Int. Cl.
| | |
|---|---|
| *F27D 11/10* | (2006.01) |
| *H05B 7/06* | (2006.01) |
| *B05D 1/02* | (2006.01) |
| *B05D 3/00* | (2006.01) |
| *B05D 3/02* | (2006.01) |

(52) U.S. Cl.
CPC ............... *B05D 1/02* (2013.01); *B05D 3/002* (2013.01); *B05D 3/0254* (2013.01)

(58) Field of Classification Search
USPC ........................................... 106/286.6
See application file for complete search history.

(56) References Cited

U.S. PATENT DOCUMENTS

| | | | | |
|---|---|---|---|---|
| 3,806,698 | A | * | 4/1974 | Hare .................. H05B 7/12 |
| | | | | 219/121.45 |
| 3,964,924 | A | | 6/1976 | Kurzeja |
| 4,135,912 | A | | 1/1979 | Matthew et al. |
| 4,287,381 | A | | 9/1981 | Montgomery |
| 4,439,491 | A | | 3/1984 | Wilson |
| 4,476,687 | A | | 10/1984 | Conklin et al. |
| 4,487,804 | A | | 12/1984 | Reven |
| 4,488,312 | A | | 12/1984 | Montgomery et al. |
| 4,575,856 | A | | 3/1986 | Persson |
| 4,726,995 | A | | 2/1988 | Chiu |
| 4,852,120 | A | * | 7/1989 | Udo .................... H05B 7/12 |
| | | | | 373/95 |
| 4,941,149 | A | * | 7/1990 | Nakamoto ............ H05B 7/12 |
| | | | | 373/96 |
| 5,115,184 | A | | 5/1992 | Arthur et al. |
| 5,795,539 | A | | 8/1998 | Sakurai et al. |
| 5,923,173 | A | | 7/1999 | Yu |
| 5,925,173 | A | * | 7/1999 | Frost .................. C23F 11/08 |
| | | | | 106/14.44 |
| 8,869,564 | B2 | | 10/2014 | Gross et al. |
| 9,452,306 | B1 | | 9/2016 | Cunigan |
| 10,694,592 | B1 | | 6/2020 | Strasser et al. |
| 11,140,755 | B2 | | 10/2021 | Strasser et al. |
| 11,653,426 | B2 | * | 5/2023 | Strasser ............. C21C 5/5211 |
| | | | | 106/286.6 |
| 2003/0035956 | A1 | | 2/2003 | Hisashi et al. |
| 2006/0034342 | A1 | | 2/2006 | Kark |
| 2006/0193364 | A1 | | 8/2006 | Shiraishi et al. |
| 2013/0099169 | A1 | * | 4/2013 | Pellet ................. C23C 22/68 |
| | | | | 252/382 |
| 2013/0148686 | A1 | | 6/2013 | Coleman et al. |
| 2013/0279534 | A1 | | 10/2013 | Coleman et al. |
| 2014/0130636 | A1 | | 5/2014 | Lundh et al. |
| 2016/0123667 | A1 | | 5/2016 | Mizutani et al. |
| 2017/0280519 | A1 | | 9/2017 | Lasorda |
| 2018/0156540 | A1 | | 6/2018 | Cobos |
| 2020/0196404 | A1 | * | 6/2020 | Strasser ................ F27D 11/08 |
| 2020/0239980 | A1 | | 7/2020 | Carabin et al. |

FOREIGN PATENT DOCUMENTS

| | | |
|---|---|---|
| DE | 19608532 A1 | 8/1997 |
| EP | 0 223 205 A1 | 5/1987 |
| EP | 0 309 583 A1 | 4/1989 |
| EP | 0334007 A1 | 9/1989 |
| EP | 1 591 738 A1 | 11/2005 |
| GB | 1 134 023 A | 11/1968 |
| GB | 1386611 A | 3/1975 |
| JP | H09-190881 A | 7/1997 |
| WO | 1998/043030 A1 | 10/1998 |
| WO | 2012/003228 A2 | 1/2012 |

OTHER PUBLICATIONS

Nov. 4, 2019 Office Action issued in U.S. Appl. No. 16/559,099.
Nov. 27, 2019 International Search Report issued in International Patent Application No. PCT/US19/49335.
Nov. 27, 2019 Written Opinion of the International Searching Authority issued in International Patent Application No. PCT/US19/49335.
"Protective Coating for Graphite Electrodes". Graphite Cova GmbH. (accessible at least as early as Feb. 22, 2016).
Apr. 6, 2020 Office Action issued in U.S. Appl. No. 16/559,099.
Dec. 27, 2019 International Search Report issued in International Patent Application No. PCT/US2019/056317.
Dec. 27, 2019 Written Opinion issued in International Patent Application No. PCT/US2019/056317.
Feb. 4, 2021 Office Action issued in U.S. Appl. No. 16/871,179.
Jul. 14, 2021 Notice of Allowance issued in U.S. Appl. No. 16/871,179.
Dec. 8, 2021 Extended Search Report issued in European Patent Application No. 19 874 104.3.
Dec. 8, 2021 Extended Search Report issued in European Patent Application No. 19 874 042.5.
Oct. 5, 2022 Office Action Issued In U.S. Appl. No. 17/464,250.
Mar. 15, 2023 Notice of Allowance Issued In U.S. Appl. No. 17/464,250.
Jun. 20, 2023 Search Report issued in European Patent Application No. 23162438.

* cited by examiner

METHODS OF PROTECTING FURNACE ELECTRODES WITH COOLING LIQUID THAT CONTAINS AN ADDITIVE

CROSS-REFERENCE TO RELATED APPLICATIONS

This application is a continuation of U.S. application Ser. No. 17/464,250, filed on Sep. 1, 2021, which is a continuation of U.S. application Ser. No. 16/871,179, filed May 11, 2020, which is a continuation of U.S. application Ser. No. 16/559,099, filed Sep. 3, 2019, which in turn is a nonprovisional application that claims the benefit of U.S. Provisional Application No. 62/779,457, filed Dec. 13, 2018, and U.S. Provisional Application No. 62/745,697, filed Oct. 15, 2018.

FIELD OF DISCLOSURE

This disclosure relates to the implementation of a novel process whereby the electrode cooling water in an electric arc furnace (EAF) or ladle metallurgy furnace (LMF), or any variation of a furnace that uses water cooled electrodes in the steel making process is chemically modified. The modification provides reduced sidewall oxidation of the electrode through the formation of a protective barrier on exterior surfaces of the furnace electrodes, resulting in extended electrode life.

BACKGROUND

EAF steel producers use electrical energy to melt raw materials to produce 1 ton to 420 metric tons of steel in vessels. Electrical energy can be delivered to the furnace as alternating current (AC) or direct current (DC). The electrical power delivered to the raw materials can be as high as 200 MWh in the case of the largest EAF vessels. This power supply creates an electrical arc that creates the necessary heat to raise the batch of steel to temperatures as high as 1800° C. and to allow for further refinement and processing in the LMF and subsequent casting and forming operations.

The electrical power is delivered to the steel through graphite electrodes. Graphite is the material of choice for electrodes due to the following characteristics: low coefficient of thermal expansion (CTE), high tensile strength, high specific resistance, electrical resistance that is relatively independent of temperature, and nobility (cathodic to other materials).

Electrodes are consumables utilized in the electrical steel making process and account for a substantial cost for the steel maker. The environment in the electric arc furnace is violent and harsh, and causes consumption of electrodes in a range of approximately 1 kg/metric ton of steel produced to 2.5 kg/metric ton. Causes of consumption include: electrical arc at the electrode tip where localized temperature is approximately 3000° C.; electrode breakage due to movement of raw materials; thermal shock and subsequent loss of electrode tip; and oxidation of the electrode surfaces along the column due to the harsh furnace environment. Oxidation of the electrode creates the conical shape of electrodes that are in use and can account for nearly 50% of the electrode consumption.

For decades, steel producers and furnace electrode producers have attempted to reduce the oxidation rate of the graphite and carbon electrodes through many different means. One example is to use electrodes that have surfaces coated with layers formed from graphite, metal, aluminum alloys, and pure aluminum. However, these coatings are only applied once (e.g., only during the manufacturing of the electrodes), and the coatings are susceptible to chemical and physical damage that renders them ineffective. Thus, these type of coatings can have short useful life spans.

Changes in the electrode manufacturing process, in electrode coupling technology, in the recipe for the graphite electrodes, and in operational procedures like foamy slag have substantially reduced electrode consumption since 1985 when electrode consumption was between 5 to 6 kg/metric ton of steel, to 1 to 2.5 kg/metric ton of steel in 2018. While this has been an impressive reduction, market forces have heightened sensitivity to the consumption rate. Even incremental decreases in consumption rate have a substantial impact to the steel maker.

The oxidation of the electrode is a chemical reaction. The rate of oxidation of the electrode increases with increasing temperatures because the reactant molecules have more kinetic energy at higher temperatures. The reaction rate (i.e., oxidation rate) is governed by the Arrhenius equation which in almost all cases shows an exponential increase in the rate of reaction as a function of temperature.

$$k = \frac{-Ea}{k_B T}$$

Where: k=the rate constant
$k_B$=Boltzmann constant
T=absolute temperature
A=a constant for each chemical reaction
$E_a$=the activation energy
R=the universal gas constant Therefore, many designs have been developed to cool the bulk of the electrode (i.e., lower the temperature of the electrode), but have been abandoned due to safety concerns. Applying cooling water to the electrode below the molten steel bath creates a very dangerous condition in the case of an electrode break or the failure of the cooling water channel. The release of cooling water below the steel bath creates an explosion due to the rapid expansion as the water changes phase from water to steam with an approximate volumetric expansion of 1,100 times. Electrodes used in commercial steel making are currently composed exclusively of graphite and do not contain cooling water channels.

To further reduce oxidation of the electrode, spray cooling was introduced to the industry and specific designs to cool the electrode using circular spray headers with multiple vertical spray headers located at multiple locations around the circumference of the electrode.

Investigation of water application has been employed to enhance safety as well as mitigate oxidation of the electrode. Enhancements, such as providing air to atomize the water as it is discharged from the spray nozzle, have been evaluated. Electrode cooling water flow, in some facilities, varies depending upon the furnace conditions, providing an additional level of safety.

SUMMARY

In contrast to known techniques, and as disclosed herein, the process of adding an additive to the spray water system surprisingly can form an effective protective barrier on a surface of the electrode to reduce oxidative consumption of the electrode. In some aspects, this approach can provide beneficial protection over the electrode length, where the coating can exist as a precipitate coating on at least a portion of the exterior surface of the electrode that is above the furnace and as molten coating on at least a portion of the exterior surface of the electrode that is below the furnace. In other aspects, the presence of the protective barrier coating can be maintained by constantly spraying the cooling liquid onto the surface of the electrode so as to provide continuous protection against sidewall oxidation, e.g., during a steel making processes. In some aspects, this approach can simplify the transportation, packaging, and handling processes.

Thus, one objective of the present disclosure is to provide a method for chemically modifying the electrode cooling water to reduce the side wall oxidation of the furnace electrode, resulting in increased life of the electrode during the steel making process.

An aspect of the disclosure is a method for forming a protective barrier on a furnace electrode, the method including: (i) providing electrode cooling water, (ii) mixing an antioxidant additive with the electrode cooling water to form a cooling liquid, (iii) spraying at least a surface of the furnace electrode disposed adjacent a furnace with the cooling liquid, thereby cooling the furnace electrode, and (iv) forming a protective antioxidative barrier on the furnace electrode, the protective antioxidative barrier includes the antioxidant additive which has been deposited and/or precipitated on the furnace electrode from the cooling liquid.

Another aspect of the disclosure is a method for forming a protective coating on a furnace electrode that has a surface heated to a temperature of at least 700° C., the method including: (i) providing a cooling liquid that includes water and an antioxidant additive; and (ii) applying the cooling liquid to the surface of the furnace electrode so that the water evaporates and the antioxidant additive precipitates and forms the protective coating on the furnace electrode.

Another aspect of the disclosure is a method for cooling a furnace electrode, the method including: (i) dissolving an antioxidant additive in water to form a cooling liquid in which the antioxidant additive is present in an amount of from 100 mg/L to 5,000 mg/L; and (ii) applying the cooling liquid to a surface of the furnace electrode.

DETAILED DESCRIPTION OF EMBODIMENTS

Figure 1:
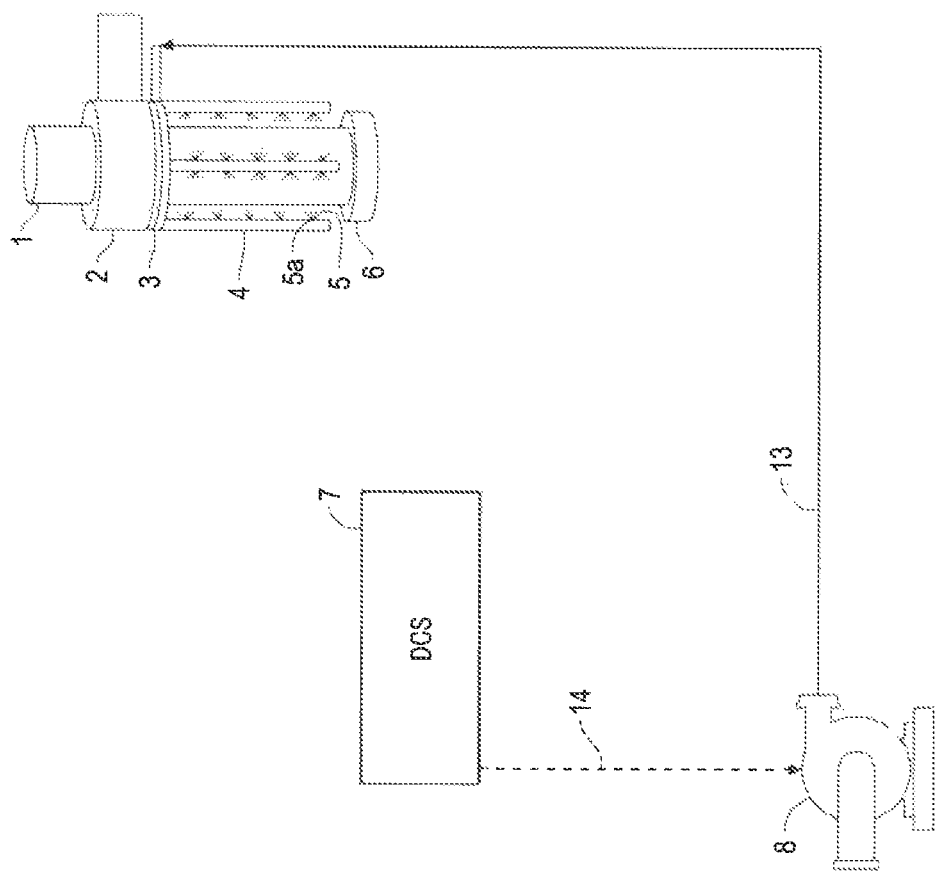
FIG. 1 is a schematic diagram illustrating a spray cooling system for a single electrode in a direct current furnace.

The disclosed cooling methods may be used to cool any high-temperature furnace electrodes that are conventionally cooled using water. For example, the disclosed cooling methods may be used to cool graphite electrodes in furnaces and/or steel making processes such as electric arc furnace, induction furnace, vacuum induction melting, argon oxygen decarburization, ladle furnace, vacuum oxygen degassing, vacuum degassing, vacuum arc remelting, and electro slag remelting. When the furnace electrode is in use, a surface of the furnace electrode can have a temperature of at least 700° C., at least 1000° C., at least 1200° C., at least 1800° C., or at least 3000° C.

As used herein, the term "antioxidant additive" refers to a compound that can form a protective antioxidative coating on the surface of the electrodes, and includes any precipitating-type chemistry or similar type chemistry that increases the total dissolved solids of the spray water, in which the additive in the cooling liquid precipitates or deposits on a surface of the electrode to form a protective coating. As used herein, the singular term "additive" can refer to either one additive or combinations of two or more additives. Mixing an antioxidant additive with water to form a chemically modified cooling liquid can allow the water to transport the antioxidant additive to the surface of the electrode where the heat from the electrode causes the water to boil off and the additive to precipitate and deposit on the electrode surface to form a protective barrier on the electrode surface. Thus, under this approach, an additive is added to a cooling liquid so that the additive intentionally precipitates out of the solution in a beneficial way, which is contrary to conventional practices where precipitating components in industrial cooling systems are considered to be problematic.

In some aspects, the protective barrier that is formed can exist as a two-phase coating on an exterior surface of the electrode. Above the furnace, the coating can exist as a layer of the precipitates/deposits (typically, as chalky white layer). This layer is believed to provide oxidative protection by shielding the graphite surface of the electrode from atmospheric oxygen and thus can reduce the rate of side wall oxidation. The precipitates/deposits layer can enter the furnace when newer portions of the electrode are moved into the furnace as the electrode is consumed during use. Once the precipitates/deposits layer is near or inside the furnace, the precipitates/deposits can melt to provide a molten coating on an exterior surface of the electrode that is within the furnace. This molten coating is also believed to shield the surface of the electrode from oxygen to reduce side wall oxidation. It is believed that the molten coating runs down substantially the entire length of the electrode (e.g., at least 90%) to the electrode tip to provide oxidative protection along the surface of the electrode that is within the furnace. In some aspects, this technique can provide continuous oxidative protection during electrode use over substantially the entire electrode length since the precipitates/deposits layer is being formed on the electrode above the furnace as the spray cooling water is applied, and the molten coating is continuously formed on a portion of the electrode below the furnace as the electrode is moved into the furnace.

The melting point of the at least one of the antioxidant additives in the cooling water, including one of the primary additives that are added, can be higher than the temperature at which rapid oxidation of the electrode material (e.g., graphite) occurs (e.g., about 700° C.). For example, the melting point of the at least one antioxidant additive can be at least 710° C., at least 900° C., at least 1,000° C., at least 1200° C., or at least 1,500° C., at least 2,000° C., at least 2400° C., and up to 3,000° C., or up to 2,800° C. This at least one antioxidant additive can also be soluble in water. For example, a solubility of the at least one antioxidant additive can be at least 10 mg/L, at least 100 mg/L, at least 500 mg/L, or at least 1 g/L. In some embodiments, the antioxidant additive can be insoluble in water.

The cooling liquid can be predominantly water, e.g., more than 95 wt %, more than 99 wt %, or more than 99.5 wt %. In some embodiments, the cooling liquid can contain 10-70 wt %, 15-60 wt %, or 20-50 wt % water, based on a total weight of the cooling liquid. In some embodiments, the water can be recycled process water or municipal water.

The concentration of the antioxidant additive in the cooling liquid can be present in amounts sufficient to form a protective barrier on the electrode. Depending on the diameter of the furnace electrode, a total amount of the antioxidant additive may be in the range of from 10 mg/l to 1,000 mg/l, from 25 mg/l to 850 mg/l, from 50 mg/l to 800 mg/l, from 100 mg/l to 600 mg/l, or from 200 mg/l to 650 mg/l. In some embodiments, the amount of antioxidant additive ranges from 30-90 wt %, 40-85 wt %, or 50-80 wt %, based on a total weight of the cooling liquid. In some embodiments, at least 95 wt % of the antioxidant additive that is added to the cooling liquid goes into solution, i.e., at the stage where it is mixed with the cooling liquid, and in some embodiments all of the antioxidant additive that is added to the cooling liquid goes into solution.

The amount of additive that is added to the cooling water can be an amount that is sufficient to provide a protective barrier on the furnace electrode. Generally, more dissolved solids in the cooling liquid will provide more precipitated solids that are deposited on the furnace electrode after the cooling liquid is sprayed onto the electrode. However, in some embodiments, the amount and type of additive should not exceed an amount that would cause substantial precipitation of the additive in the spray nozzles or the conduits thereof. In this regard, the spray nozzles and the associated conduits also operate at extremely high temperatures, and the amount and type of antioxidant additive can be selected (e.g., based on the solubility of the additive in the cooling liquid) so that the cooling liquid can be sprayed in the desired quantities to form a robust protective barrier on the electrode without scaling or clogging in the spray nozzles or with minimal scaling/clogging. To further prevent scaling/clogging, the additive can include a scale inhibitor or dispersant, and examples of these are provided below.

In some aspects, a sufficient amount of antioxidant additive is added to the cooling liquid to form a protective barrier coating on a surface of the electrode when the cooling liquid is applied to the electrode. Above the furnace, the protective barrier coating can have a thickness ranging from 0.005 to 1 mm, 0.01 to 0.7 mm, or from 0.05 to 0.3 mm. In some embodiments, the thickness of the protective barrier is not more than 5 mm, or 2 mm. The cooling water can be sprayed so that the protective barrier coating has a substantially uniform structure on an exterior surface of the electrode that is above the furnace, i.e., so that there are no patches where the electrode is exposed and so the coating thickness is substantially constant across the surface (e.g., deviating by no more than 20% from an average thickness). Above the furnace, the protective barrier coating typically has a white, chalky or frosted appearance. This coating can be formed to have sufficient structural integrity and cohesiveness to withstand the harsh environment during electrode use, including high temperatures and mechanical vibrations. In this regard, the coating can form a tenacious protective barrier that does not flake or otherwise come off of the electrode surface during use. As described above, it is believed that at least some of the precipitated/deposited antioxidant additive becomes molten inside the furnace, which forms a molten coating that flows downward along the exterior surface of the electrode toward the tip of the electrode.

The method provided herein can use any suitable antioxidant additive and is not inherently limited to any specific chemistries. In this regard, it is believed that the protective barrier coating can be provided by sufficient dissolved solids in the cooling water. Exemplary antioxidant additives suitable for use in the present method include fluorides (e.g., alkali metal fluorides; alkaline earth metal fluorides, such as calcium fluoride and magnesium fluoride; transition metal fluorides; post-transition metal fluorides; ammonium fluorides; and sodium aluminum fluoride), chlorides (e.g., alkali metal chlorides; alkaline earth metal chlorides, such as calcium chloride and magnesium fluoride; transition metal chlorides; post-transition metal chlorides; and ammonium chlorides), bromides (e.g., alkali metal bromides; alkaline earth metal bromides, such as calcium bromide and magnesium bromide; transition metal bromides; post-transition metal bromides; and ammonium bromides), nitrates (e.g., alkali metal nitrates; alkaline earth metal nitrates, such as calcium nitrate and magnesium nitrate; transition metal nitrates; post-transition metal nitrates; and ammonium nitrates), sulfates (e.g., alkali metal sulfates; alkaline earth metal sulfates, such as calcium sulfate and magnesium sulfate; transition metal sulfates; post-transition metal sulfates; and ammonium sulfates), silicates (e.g., alkali metal silicates), phosphates or orthophosphates (e.g., alkali metal salts or alkaline earth metal salts, such as calcium or magnesium salts, or transition metal salts or post-transition metal salts or ammonium salts of orthophosphoric acid, aluminum orthophosphate), phosphate derivatives or polyphosphates (e.g., alkali metal salts or alkaline earth metal salts, such as calcium or magnesium salts, or transition metal salts or post-transition metal salts or ammonium salts of pyrophosphoric acid, tripolyphosphoric acid, tetrapolyphosphoric acid, and trimetaphosphoric acid, and alkali metal hexametaphosphate), alkali metal salts or alkaline earth metal salts of boric oxide, metaboric acid, or boric acid (e.g., sodium borate), sodium borofluoride, and combinations thereof. In some embodiments, the antioxidant additive is an alkali metal hexametaphosphate (e.g., sodium hexametaphosphate), an alkaline earth metal hexametaphosphate, a transition metal hexametaphosphate, ammonium hexametaphosphate, an alkali metal salt of pyrophosphoric acid (e.g., tetrasodium pyrophosphate), an alkaline earth metal salt of pyrophosphoric acid (e.g., a calcium salt of pyrophosphoric acid, a magnesium salt of pyrophosphoric acid), a transition metal salt of pyrophosphoric acid, an ammonium salt of pyrophosphoric acid, or combinations thereof.

As used herein, the term "alkali metal" refers to lithium, sodium, potassium, rubidium, and cesium. The term "alkaline earth metal" refers to beryllium, magnesium, calcium, strontium, and barium. The term "transition metal" refers to scandium, titanium, vanadium, chromium, manganese, iron, cobalt, nickel, copper, yttrium, zirconium, niobium, molybdenum, ruthenium, rhodium, palladium, silver, hafnium, tantalum, tungsten, rhenium, osmium, iridium, platinum, and gold. The term "post-transition metal" refers to aluminum, indium, gallium, tin, bismuth, lead, thallium, zinc, cadmium, and mercury.

The term "ammonium" refers to a cation formed from an amine and a hydrogen ion. Exemplary amines include ammonia, a primary amine represented by formula $NH_2R$, a secondary amine represented by $NHR_2$, and a tertiary amine represented by formula $NR_3$, where each R is independently an optionally substituted alkyl, an optionally substituted aryl, and an optionally substituted arylalkyl. The term "alkyl", as used herein, refers to a straight, branched, or cyclic hydrocarbon fragment. Non-limiting examples of such hydrocarbon fragments include methyl, ethyl, propyl, isopropyl, butyl, isobutyl, t-butyl, pentyl, isopentyl, neopentyl, hexyl, isohexyl, 3-methylpentyl, 2,2-dimethylbutyl, and 2,3-dimethylbutyl. As used herein, the term "cyclic hydrocarbon" refers to a cyclized alkyl group. Exemplary cyclic hydrocarbon (i.e. cycloalkyl) groups include, but are not limited to, cyclopropyl, cyclobutyl, cyclopentyl, cyclohexyl, norbornyl, and adamantyl. Branched cycloalkyl groups, such as exemplary 1-methylcyclopropyl and 2-methycyclopropyl groups, are included in the definition of cycloalkyl as used in the present disclosure. The term "aryl," as used herein, and unless otherwise specified, refers to a substituent that is derived from an aromatic hydrocarbon (arene) that has had a hydrogen atom removed from a ring carbon atom. Aryl includes phenyl, biphenyl, naphthyl, anthracenyl, and the like. The term "arylalkyl" as used in this disclosure refers to a straight or branched chain $C_1$ to $C_8$ alkyl moiety that is substituted by an aryl group or a substituted aryl group having 6 to 12 carbon atoms. "Arylalkyl" includes benzyl, 2-phenethyl, 2-methylbenzyl, 3-methylbenzyl, 4-methylbenzyl, 2,4-dimethylbenzyl, 2-(4-ethylphenyl)ethyl, 3-(3-propylphenyl)propyl.

In some embodiments, the cooling liquid contains a mixture of an alkali metal hexametaphosphate and an alkali metal salt of pyrophosphoric acid. A ratio of the weight of alkali metal hexametaphosphate to the weight of the alkali metal salt of pyrophosphoric present in the cooling liquid is in a range of from 1:100 to 100:1, from 1:50 to 50:1, or from 1:10 to 10:1.

In some embodiments, a mixture of a salt of hexametaphosphate and a salt of pyrophosphoric acid is added to the cooling water. The cations of these salts can be exchanged with the alkali metal cations or alkaline earth metal cations (e.g., calcium) initially present in the cooling water to form in situ alkali metal salts (or alkaline earth metal salts) of hexametaphosphate and pyrophosphoric acid. In some embodiments, when an alkali metal hexametaphosphate (e.g., sodium hexametaphosphate) is added to the cooling water, the alkali metal cation can be exchanged with the alkaline earth metal cations (e.g., calcium) initially present in the cooling water to form in situ alkaline earth metal phosphate (e.g., calcium phosphate), alkaline earth metal phosphonate, and/or alkaline earth metal trimetaphosphate, which in turn are sprayed onto the furnace electrode to form the protective barrier. In some embodiments, alkaline earth metal cations (e.g., in the form of calcium, such as calcium chloride) are deliberately added to the cooling water to facilitate the formation of the protective barrier.

The specific additive(s) can be selected depending on the initial water chemistry of the spray water that is used to cool the electrode and the final water chemistry of the spray water (i.e., after the additive is added). This selection can depend on several factors that are specific to the particular furnace, including the ability to form a molten coating in the furnace while the electrode is in use. In some embodiments, specific compounds may be considered to be particularly useful additives for forming the protective coating, such as one or more of phosphates, phosphonates, calcium salts, magnesium salts, molybdates, borates, and silicates. In some embodiments, including Examples 2-4 below, the cooling water can contain (i) one or more additive selected from phosphates, phosphonates, calcium salts, magnesium salts, molybdates, boron salts, and silicates, and (ii) one or more additive selected from a scale inhibitor and a dispersant.

In some embodiments, the additive can be selected so that the cooling liquid can have a hardness of at least 0.5 mmol/L, at least 1.0 mmol/L, at least 1.5 mmol/L, or at least 3 mmol/L. In some embodiments, the hardness is not more than 4 mmol/L, not more than 2 mmol/L, or not more than 1.2 mmol/L. As used herein, the term "hardness" refers to the sum of the molar concentrations of calcium and magnesium ions in the cooling liquid. It is believed that using a cooling liquid having a higher hardness can improve the formation of the protective barrier by, for example, increasing the speed of formation of the protective barrier.

The additive can also include a scale inhibitor to prevent scaling in the nozzle or conduits, such as scale inhibitors and dispersants selected from the group consisting one or more of unsaturated carboxylic acid polymers such as polyacrylic acid, homo or co-polymaleic acid (synthesized from solvent and aqueous routes); acrylate/2-acrylamido-2-methylpropane sulfonic acid (APMS) copolymers, acrylate/acrylamide copolymers, acrylate homopolymers, terpolymers of carboxylate/sulfonate/maleate, terpolymers of acrylic acid/AMPS; phosphonates and phosphinates such as 2-phosphonobutane-1,2,4-tricarboxylic acid (PBTC), 1-hydroxy ethylidene-1,1-diphosphonic acid (HEDP), amino tris methylene phosphonic acid (ATMP), 2-hydroxyphosphonocarboxylic acid (HPA), and combinations thereof.

Industrial application of this method indicates that an additional 2 to 40 percent, 2 to 30 percent, 5 to 20 percent, or 3 to 15 percent electrode consumption is avoided through the implementation of this method. For example, the protective coating can reduce oxidative electrode consumption by 2 to 30 percent as compared to a like method in which only water cools the furnace electrode. As would be appreciated in the art, a reduction in oxidative electrode consumption of even 2 percent is considered to be significant and can provide for substantial savings. Electrode consumption is typically determined over a period of time. For example, in one embodiment, the electrode consumption is calculated as the consumption over one week period. In other embodiments, the consumption may be calculated over a two week period. In still other embodiments, the electrode consumption is calculated over a one month period. In still further embodiments, the consumption is calculated for periods longer than about 3 days. In some embodiments, the consumption is calculated weekly or monthly. Electrode consumption can be determined by methods known to one skilled in the art, for example, by measuring the value of the eddy current in the electrode, which can be correlated to the consumption rate. See U.S. Pat. No. 4,048,556 to Roach et al., which is incorporated herein by reference in its entirety. In some embodiments, actual electrode consumption can be measured in the process of replacing the furnace electrodes per ton of produced steel. For example, the number of heats of a known mass of steel produced by the furnace (e.g., the EAF or LMF) per electrode can be measured. As an another example, electrode consumption can be measured by removing the electrode, weighing the electrode, and repeating this process for other electrodes that are used within a specified time period.

FIG. 1 illustrates an example of a spray cooling arrangement for a direct current furnace. The electrode holder 2 holds the graphite electrode 1 which extends into the furnace through the top of the furnace 6. The size of the graphite electrode 1 can typically vary from 75 mm to 700 mm in diameter, although electrodes of up to 800 mm are available. The antioxidant additive and water can be pre-mixed offline to form a cooling liquid which is supplied to the flow path 13 via the pump 8 (e.g., a booster pump).

The spray cooling system (i.e., the cooling bank) has a circular ring distribution header 3 and a vertical spray distribution header 4. The vertical spray distribution header 4 includes a plurality of nozzles 5a from which the cooling liquid 5 is sprayed onto the outer circumference of the electrode 1. In this manner, the cooling of the electrode occurs from the electrode holder 2 to the top of the furnace 6. At the point of impingement, or where the water meets the electrode surface, the temperature of the cooling liquid can be below the boiling point of the liquid. If cooling liquid enters the furnace during operation, it would evaporate prior to reaching the molten metal bath and avoid explosion. The cooling liquid may also provide protection for various components of the cooling water system in fluid communication with the electrode cooling water. These components include, the spray nozzles, and components on flow path 13 (e.g., control valves, flow meters, and pumps).

In most embodiments, the cooling liquid is constantly applied to the electrodes. The application of cooling liquid can be generally held to below 4.5 $m^3/h$ for a 600-mm diameter electrode. Flow rates for smaller and larger electrodes can be varied based upon the surface coverage area. Depending on the application, the flow rate may vary from 0.25 $m^3/h$ to 10 $m^3/h$, from 1 $m^3/h$ to 5 $m^3/h$, or from 2 $m^3/h$ to 4 $m^3/h$, for each electrode (i.e., phase). The cooling liquid can be sprayed in a direction orthogonal to the longitudinal axis of the graphite electrode 1, or at a downward or upward angle, e.g., of from 10° to 35° with respect to the horizontal. The cooling liquid can be sprayed with a jet pressure of from 0.5 to 3 $kg/cm^2$ and at a rate of from 0.8 to 6.0 l/minute, or up to 75 l/minute (about 20 gallons/minute), for each electrode. A sufficient amount of cooling liquid is sprayed at the electrode to keep the electrode cooled. In this process, a sufficient amount of the cooling liquid is applied to the surface of the furnace electrode so that the protective coating is formed to reduce the oxidative electrode consumption, as compared to a like method in which only water cools the furnace electrode.

When the spray of cooling liquid 5 contacts the hot surface of the graphite electrode 1, the cooling liquid evaporates to produce a cooling effect on at least the portion of the electrode 1 above the furnace and to deposit the antioxidant additive, e.g., when the additive dissolved solids precipitates out of the cooling liquid. For example, as the cooling liquid flows down the exterior surface of the electrode, the water evaporates, thereby concentrating the antioxidant additive in the remaining cooling liquid. When the concentration of the antioxidant additive in the remaining cooling liquid reaches a saturation point, the excess antioxidant additive will precipitate/deposit on the electrode surface to form a protective barrier. The protective barrier made up of the antioxidant additive would also form when the remaining water in the cooling liquid is driven off.

In some embodiments, the electrode 1 can be cooled uniformly over its entire length above the furnace. As the cooling liquid is sprayed onto the portion of the electrode 1 above the furnace, this portion may be covered uniformly by the precipitates/deposits protective barrier. As the production of steel progresses, the electrode below the furnace can be consumed by processes, such as tip sublimation, sidewall oxidation, and/or losses due to various forms of breakage, butt losses, and spalling. To account for these losses, the electrode can be moved or pushed into furnace so as to introduce portions of the electrode that was previously above the furnace into the furnace. The precipitates/deposits coating can then melt as it moves toward the interior of the furnace to form a molten protective coating on at least a portion of the electrode below the furnace.

Figure 2:
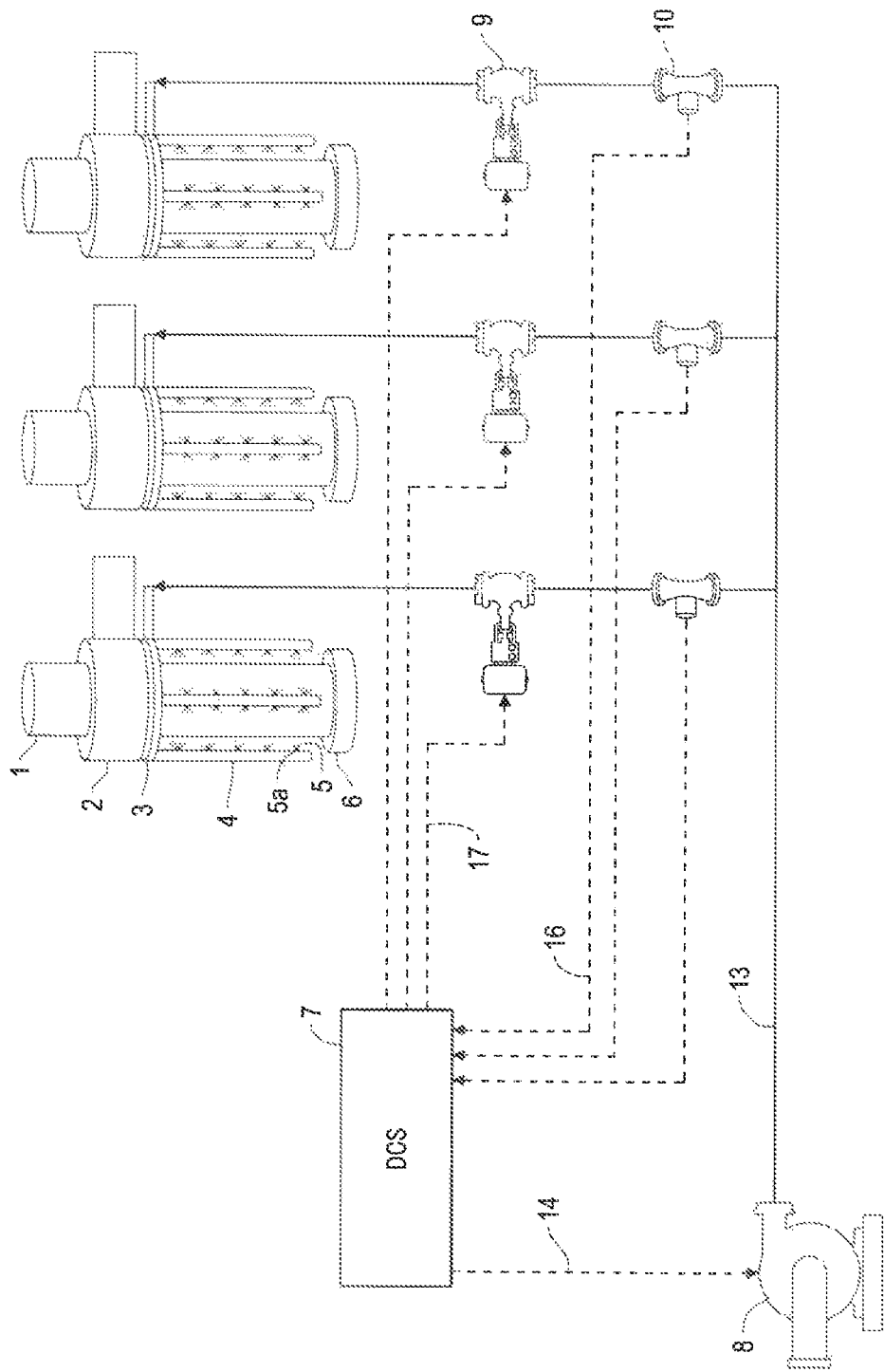
FIG. 2 is a schematic diagram illustrating a spray cooling system with feedback and control of individual electrode cooling banks for each of the three electrodes in an alternating current furnace.

FIG. 2 illustrates an example of the spray cooling arrangement for an alternating current furnace. There are three electrodes in the alternating current furnace, and each of the electrodes supply one of the electrical phases.

Similar to FIG. 1, FIG. 2 includes a flow path 13 that allows the cooling liquid to flow to the spray cooling system. A control valve 9 regulates the flow for spray cooling to an individual electrode, based upon feedback 17 from a distributed control system (DCS) 7. An in-line flow meter 10 measures the flow rate of cooling liquid and then sends a feedback 16 to the DCS 7 that actuates a pump 8 (e.g., a booster pump) to supply cooling liquid, which is pre-mixed offline. For example, the DCS 7 sends a feedback 14 to the pump 8 to supply the cooling liquid. The parameters (e.g., electrode and spray parameters) for this spray cooling arrangement can be the same or substantially the same as those described for FIG. 1.

Figure 3:
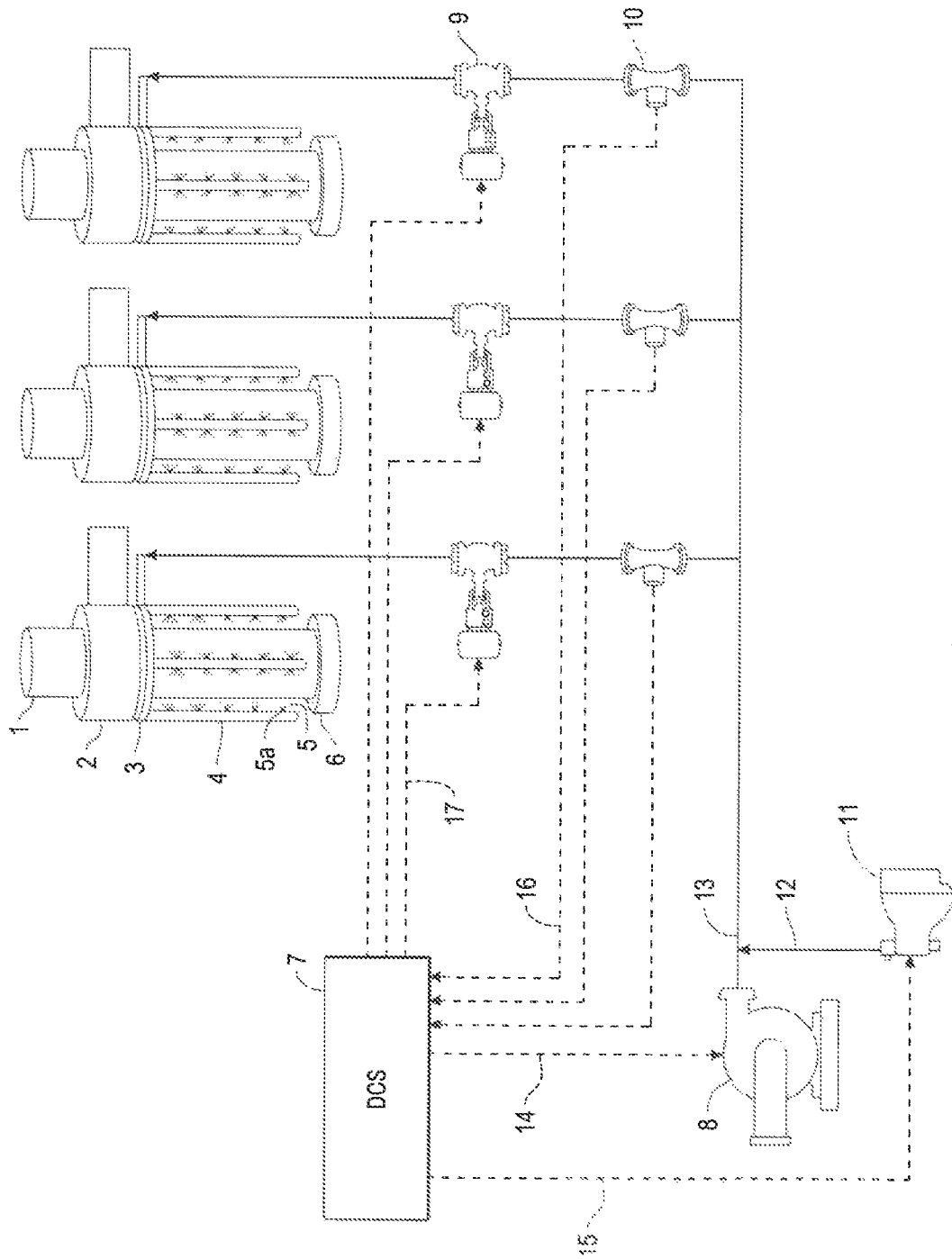
FIG. 3 is a schematic diagram illustrating a spray cooling system with feedback and control of individual electrode cooling banks and a chemical metering skid for the electrodes in an alternating current furnace.

FIG. 3 illustrates an example of the spray cooling arrangement for an alternating current furnace. In this embodiment, the spray cooling arrangement includes a chemical metering skid 11 to supply the antioxidant additive in-line. The in-line flow meter 10 measures the flow rate of cooling liquid and then sends a feedback 16 to the DCS 7 that actuates: (i) a pump 8 (e.g., a booster pump) to supply cooling water, and (ii) a chemical metering skid 11 to supply the antioxidant additive. For example, the DCS 7 can send a feedback 14 to the pump 8 to supply the cooling water, as described above in connection with FIG. 2. The DCS 7 can also perform the calculations and send a digital or an analogue feedback 15 to the chemical metering skid to supply the antioxidant additive at an accurate and discrete dosage. The dosage and the timing between each dosage may be empirically determined. For example, the dosage and timing may depend on the furnace type, furnace operation, and the condition of the steel bath. The antioxidant additive can be supplied from the chemical metering skid 11 in a neat form (if liquid) or as a concentrated solution. The antioxidant additive can be introduced to (e.g., injected into) the flow path 13 at location 12, downstream of the pump 8. Supplying the antioxidant additive at location 12 can allow the mixing of the antioxidant additive with the water to form the cooling liquid. In some embodiments, the antioxidant additive is introduced to the flow path 13 at a location upstream of the pump 8. The parameters (e.g., electrode and spray parameters) for this spray cooling arrangement can be the same or substantially the same as those described for FIGS. 1 and 2.

Accordingly, the consumption of the electrodes can be reduced through the application of an antioxidant additive in the electrode spray cooling liquid. The presence of the antioxidant additive in the electrode spray cooling water allows for the formation of protective barrier at the same time the electrode is being cooled, and thus can be an efficient and effective method for reducing the oxidation of the electrode.

Utilization of surfactants as an additive may enhance the performance of the cooling liquid and thus may further reduce the consumption rate of electrode. In some embodiments, the cooling liquid further comprises a surfactant or a blend of surfactants of the amount and type described in the U.S. Provisional Application No. 62/745,729, titled "Spray Cooling Furnace Electrodes With A Cooling Liquid That Contains Surfactants," filed on Oct. 15, 2018, the entirety of which is hereby incorporated by reference herein. The cooling water may include other additives such as biocides, detergents, wetting agents, and the like.

Example 1

A cooling liquid containing water, sodium hexametaphosphate, and tetrasodium pyrophosphate was sprayed onto hot ultra-high-power (UHP) electrodes. Each electrode had a diameter of 400 mm. The cooling liquid contained a total antioxidant additive amount of 500 mg/l. The spray rate of the cooling liquid was dynamic and was based upon furnace conditions in operation. The spray rate ranged between 3 gallons and 20 gallons per minute per electrode during the heating of the electrode. Electrode consumption was reduced from about 2.3-2.5 lb/ton (see Comparative Example 1) to 1.8-2.0 lb/ton over a two-week evaluation period.

Example 2

This example tested the effect of a first and second additive on the oxidative consumption of an electrode at a steel manufacturing site. This site is a three phase EAF production facility, which experiences an average electrode consumption rate of about 2-3 lb/ton. The dosage of the first additive was first varied and then kept constant. When the dosage of the first additive was increased, increasing levels of electrode protection were confirmed, and the sidewall oxidation of the electrode decreased. However, the maximum dosage of the first additive was limited by the tendency of the cooling liquid to scale. (Similar observations regarding the dosages and the levels of sidewall oxidation were also observed in Examples 3 and 4 below.) Inspections of the spray ring and nozzles were regularly made to ensure proper water flow and spray pattern (to the electrodes) were obtained during the entire campaign.

Figure 4:
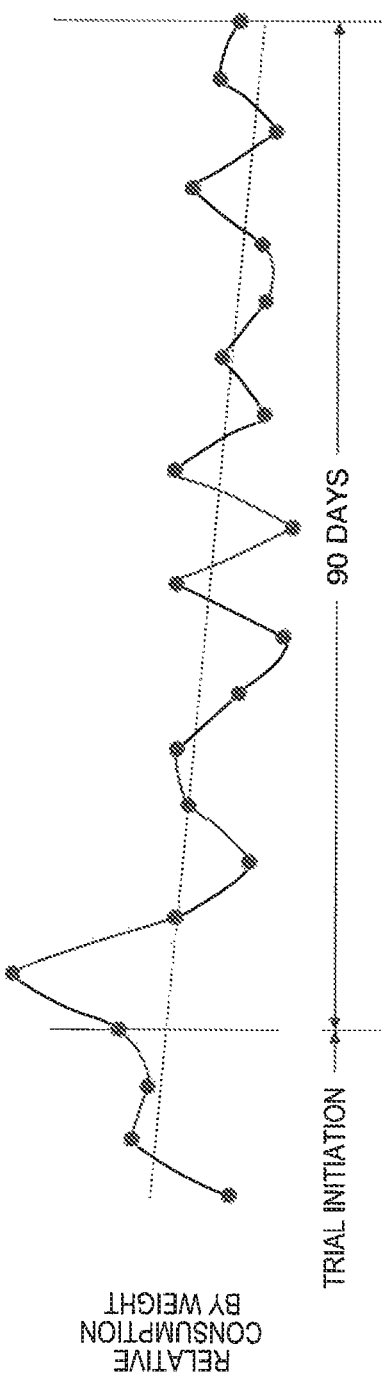
FIG. 4 is a graph showing the relative electrode consumption by weight of produced steel.

When the dosage of the first additive was held constant, the second additive was added to further study the impact on electrode consumption rates. At the end of the trial period, a thorough study of the plant operating data was conducted, and a reduction in electrode consumption between 3% to 9% was observed. The specific reduction depended on the steel melting practices that were used (i.e., operation conditions). The reduction in electrode consumption over time is shown in FIG. 4. The bold vertical line in FIG. 4 indicates the start of the trial period.

Example 3

Figure 5:
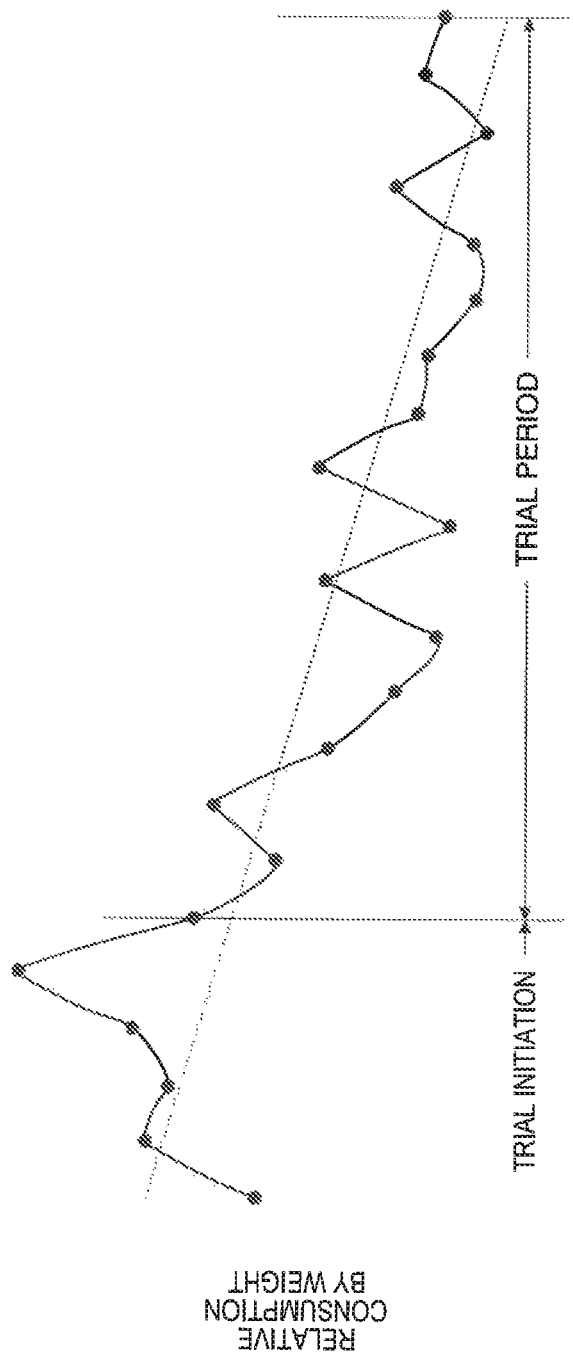
FIG. 5 is a graph showing the relative electrode consumption by weight of produced steel.

This example tested the effect of a third additive composition on the oxidative consumption of an electrode at another steel manufacturing site. This site is a three phase EAF production facility, which experiences high electrode costs and an average electrode consumption rate of about 5-7 lb/ton. The study of the third additive was based on spray water chemistry and operational conditions of the plant. Various dosages of the third additive were studied during the trial with final dosage targets based on operational changes managed by the hosting plant. A constant dosage of the third additive was also studied. The test showed an electrode consumption reduction between 5% to 12% over a 90-day test period, and further improvements are believed to be manageable. The reduction in electrode consumption is shown in FIG. 5. The bold vertical line in FIG. 5 indicates the start of the trial period.

Example 4

This example tested the effect of a fourth additive composition on the oxidative consumption of an electrode at another North American steel manufacturing site. This site is a three phase EAF production facility, which experiences initial high electrode costs and consumption rates. The study of the fourth additive was selected based on the plant spray water chemistry and various operating constraints of the plant. The dosage of the fourth additive was varied throughout a 90-day trial as different operating conditions were evaluated. It was found that during the trial period the consumption of the electrodes were reduced, on average, by 6%.

Comparative Example 1

A cooling liquid containing water only was sprayed onto hot ultra-high-power (UHP) electrodes. Each electrode had a diameter of 400 mm. The spray rate of the cooling liquid was dynamic and was based upon furnace conditions in operation. The spray rate ranged between 3 gallons and 20 gallons per minute per electrode during the heating of the electrode. The electrode consumption rate was determined to be 2.3-2.5 lb/ton over a two-week evaluation period.

It will be apparent to those skilled in the art that variations of the process described herein are possible and are intended to be encompassed within the scope of the present invention.

What is claimed is:

1. A method for protecting a furnace electrode comprising:
   (i) combining at least one antioxidant additive with water to form a chemically modified liquid so that the at least one antioxidant additive is present in the chemically modified liquid in an amount that is in a range of from 10 mg/L to 5,000 mg/L, and wherein the at least one antioxidant has a solubility in water of at least 100 mg/L;
   (ii) supplying the chemically modified liquid to a spray system that is configured to spray an outer surface of the furnace electrode;
   (iii) discharging the chemically modified liquid from the spray system to spray the outer surface of the furnace electrode when the outer surface has a temperature of at least 700° C.; and
   (iv) forming a coating on the outer surface of the furnace electrode by evaporating water from the chemically modified liquid that has been sprayed on the outer surface of the furnace electrode.

2. The method of claim 1, wherein the at least one antioxidant additive includes a polyphosphate.

3. The method of claim 1, wherein the at least one antioxidant additive includes one or more component selected from phosphates, phosphonates, calcium salts, magnesium salts, molybdates, boron salts, and silicates.

4. The method of claim 1, wherein the at least one antioxidant additive includes one or more component with a melting point of at least 2400° C.

5. The method of claim 1, wherein the chemically modified liquid is sprayed onto the hot electrode while a portion of the furnace electrode is positioned inside a furnace and another portion of the furnace electrode is positioned above the furnace.

6. The method of claim 1, wherein the chemically modified liquid includes the at least one antioxidant additive in an amount in the range of from 10 mg/l to 1,000 mg/l.

7. The method of claim 1, wherein the furnace electrode is an electric arc furnace electrode or a ladle metallurgy furnace electrode.

8. The method of claim 1, wherein the at least one antioxidant additive includes a calcium based salt.

9. The method of claim 1, wherein the coating has a thickness in a range of from 0.005 to 5 mm.

10. The method of claim 1, wherein the chemically modified liquid includes at least 95 wt. % water.

11. The method of claim 1, wherein the at least one antioxidant additive includes a transition metal salt.

12. The method of claim 1, wherein the chemically modified liquid is more than 99 wt. % water.

13. The method of claim 1, wherein the at least one antioxidant has a solubility in water of at least 500 mg/L.

\* \* \* \* \*